(12) United States Patent
Naylor et al.

(10) Patent No.: US 7,937,884 B1
(45) Date of Patent: May 10, 2011

(54) FISHING LURE STORAGE DEVICE AND METHOD OF USE THEREOF

(76) Inventors: Terry Naylor, Tulelake, CA (US); Camille Williams-Naylor, Tulelake, CA (US)

( * ) Notice: Subject to any disclaimer, the term of this patent is extended or adjusted under 35 U.S.C. 154(b) by 592 days.

(21) Appl. No.: 12/150,548

(22) Filed: Apr. 29, 2008

(51) Int. Cl.
A01K 97/00 (2006.01)

(52) U.S. Cl. ............... 43/57.1; 43/54.1; 206/315.11

(58) Field of Classification Search ............ 43/57.1, 43/54.1; 206/315.11
See application file for complete search history.

(56) References Cited

U.S. PATENT DOCUMENTS

| | | | | |
|---|---|---|---|---|
| 1,888,304 A * | 11/1932 | Bekeart | | 43/57.1 |
| 2,020,394 A * | 11/1935 | Bates | | 206/362 |
| 2,711,050 A * | 6/1955 | McIntyre | | 43/57.1 |
| 3,948,579 A | 4/1976 | Schirmer | | |
| 4,829,699 A * | 5/1989 | Perkins | | 43/57.1 |
| 4,852,293 A * | 8/1989 | Levine et al. | | 43/54.1 |
| 4,936,044 A * | 6/1990 | Bruce | | 43/57.1 |
| D355,528 S | 2/1995 | Croft et al. | | |
| D361,659 S | 8/1995 | Kahl et al. | | |
| 5,475,943 A | 12/1995 | Hodges | | |
| 5,606,820 A * | 3/1997 | Suddeth | | 43/57.1 |
| 5,704,158 A * | 1/1998 | Whiteaker | | 43/57.1 |
| 6,134,825 A | 10/2000 | Moffett et al. | | |
| 6,516,555 B2 | 2/2003 | Buzzell | | |
| 6,766,610 B1 | 7/2004 | Lin | | |
| 6,959,811 B1 | 11/2005 | Hoover | | |
| 7,168,204 B2 | 1/2007 | Wieringa et al. | | |
| 2003/0182845 A1 * | 10/2003 | Pfeffer | | 43/57.1 |
| 2005/0044774 A1 * | 3/2005 | Shannon | | 43/54.1 |
| 2005/0097807 A1 * | 5/2005 | Hoover | | 43/54.1 |
| 2007/0017146 A1 * | 1/2007 | Glidewell et al. | | 43/54.1 |

* cited by examiner

*Primary Examiner* — Christopher P Ellis
(74) *Attorney, Agent, or Firm* — Montgomery Patent and Design; Robert C. Montgomery

(57) ABSTRACT

An apparatus that organizes, stores, and transports fishing lures comprising a series of vertical dividers as would be found in a filing cabinet each having a perforated panel that allows the fishing lure and hook to be hung is herein disclosed. In such a manner, the fishermen can organize their fishing lures by style, size, or class and remove the respective panel from the dividers to select the appropriate lure. This storage method allows lures to be stored with the hooks attached while reducing the chance of the hooks and lures from becoming entangled. The storage box also comprises a top handle for transportation.

15 Claims, 6 Drawing Sheets

FISHING LURE STORAGE DEVICE AND METHOD OF USE THEREOF

RELATED APPLICATIONS

The present invention was first described in an Official Record of Invention on Feb. 22, 2007; on file at the offices of Montgomery Patent and Design, LLC. There are no previously filed, nor currently any co-pending applications, anywhere in the world.

FIELD OF THE INVENTION

The present invention relates generally to a storage device and method of storing a plurality of fishing lures such that said storage device provides an organizing, storing, and transporting means for said plurality of fishing lures.

BACKGROUND OF THE INVENTION

More Americans fish than play golf and tennis combined. If fishing were ranked as a corporation, it would be forty-seven (47) on the 2007 Fortune 500 list of America's largest companies based on total sales—well ahead of Microsoft or Time Warner. At nearly forty million (40,000,000), the number of American anglers is more than thirty-three (33) times the average attendance per game at all Major League baseball parks combined. The National Sporting Goods Association ranked fishing sixth (6$^{th}$) out of forty-two (42) recreation activities, preceded only by walking, swimming, exercising, camping and bowling.

As has been made quite evident, a great number of people around the world enjoy fishing. Whether fishing for food or simply for the sport of it, the calmness and serenity of the pastime coupled with the excitement of landing "the big one" makes fishing a popular recreational activity. However, the tranquility of the pastime is quickly compromised when dealing with the frustration of tangled lures. This tangling is especially common when lures are stored with the fish hooks attached to them. In fact, many experts recommend removing the hooks when storing lures. However, the time spent removing and reattaching hooks to lures may be as great as or greater than that spent untangling them. While this wasted time is certainly stressful when fishing for relaxation, it can mean the difference between winning and losing in a fishing contest.

Accordingly, there exists a need for a means by which fishing lures can be stored, with their hooks attached, without the disadvantages and aggravations mentioned above. The development of the present invention fulfills this need.

U.S. Pat. No. 7,168,204 filed by Weiringa, et al. discloses a box for storing fishing flies. This patent does not appear to disclose a fishing lure storage device which maintains a plurality of fishing lures, when stored in a vertical orientation, nor does it appear that this patent discloses a device that possesses a separate storage compartment that is removable from the device.

U.S. Pat. No. 6,959,811 filed by Hoover discloses a tackle container with nesting space. This patent does not appear to disclose a fishing lure storage device which maintains a plurality of fishing lures, when stored in a vertical orientation, nor does it appear that this patent discloses a device that possesses a separate storage compartment that is removable from the device.

U.S. Pat. No. 6,516,555 filed by Buzzell discloses a fly fish lure holder. This patent does not appear to disclose a fishing lure storage device which maintains a plurality of fishing lures, when stored in a vertical orientation, nor does it appear that this patent discloses a device that possesses a separate storage compartment that is removable from the device.

U.S. Pat. No. 6,134,825 filed by Moffett et al. discloses a fishing lure container. This patent does not appear to disclose a fishing lure storage device which maintains a plurality of fishing lures, when stored in a vertical orientation, nor does it appear that this patent discloses a device that possesses a separate storage compartment that is removable from the device.

U.S. Pat. No. 5,606,820 filed by Suddeth discloses a tangle-free fishing lure storage container. This patent does not appear to disclose a fishing lure storage device which maintains a plurality of fishing lures, when stored in a vertical orientation, nor does it appear that this patent discloses a device that possesses a separate storage compartment that is removable from the device.

U.S. Pat. No. 5,475,943 filed by Hodges discloses fishing tackle boxes with separable leaves for supporting lures. This patent does not appear to disclose a fishing lure storage device which maintains a plurality of fishing lures, when stored in a vertical orientation, nor does it appear that this patent discloses a device that possesses a separate storage compartment that is removable from the device.

U.S. Pat. No. D361,659 filed by Kahl discloses a tackle box. This design patent does not appear to be similar to the disclosed invention in either ornamental or industrial design and does not appear to possess perforated boards for maintaining lures in a vertical orientation.

U.S. Pat. No. D355,528 filed by Croft et al. discloses a card for holding bait. This design patent does not appear to be similar to the disclosed invention in either ornamental or industrial design and does not be a fishing lure storage container.

U.S. Pat. No. 3,948,579 filed by Schirmer discloses a tackle box with improved tray structures. This patent does not appear to disclose a fishing lure storage device which maintains a plurality of fishing lures solely in a vertical orientation, nor does it appear that this patent discloses a device that possesses a separate storage compartment that is removable from the device and may be opened at the same time as the other compartment.

The prior art appears to disclose devices that store fishing lures in a horizontal orientation. The prior art does not appear to disclose a fishing lure storage device which maintains a plurality of fishing lures, when stored in a vertical orientation, nor does it appear that this patent discloses a device that possesses a separate storage compartment that is removable from the device.

SUMMARY OF THE INVENTION

In view of the foregoing disadvantages inherent in the prior art, it has been observed that there is need for a fishing lure storage device that provides a method for organizing, storing, and transporting a plurality of fishing lures.

The fishing lure storage device possesses a series of vertical dividers as would be found in a filing cabinet each having a perforated grid panel that allows the fishing lure and fishing lure hook to be hung. In such a manner, the user can organize the fishing lures by style, size, or class and remove the respective perforated grid panel from the vertical dividers to select the appropriate fishing lure.

Another object of the present invention provides for the fishing lure storage device storage method allowing fishing lures to be stored with the fishing lure hooks attached while reducing the chance of the fishing lure hooks and fishing lures entangling.

Another object of the present invention provides for the fishing lure storage device comprising a hard side case handle or an alternate soft side case carrying straps for transportation, hard side case cover storage compartments, and a tool and small parts storage box for added storage.

Another object of the present invention provides for the fishing lure storage device comprising a hard side case, a hard side case base, a hard side case cover, a hard side case hinge, a hard side case latch, a hard side case handle, hard side case vertical divider rack ledges, a hard side case cover storage compartment, a hard side case cover storage compartment cover, a hard side case cover storage compartment cover latch, a vertical divider rack, vertical dividers, perforated grid panels, a tool and small parts storage box, a tool and small parts storage box base, a tool and small parts storage box handle, a tool and small parts storage box cover, a tool and small parts storage box latch, and a tool and small parts storage box hinge.

Still another object of the present invention provides for the hard side case comprising a molded plastic case with a hard side case cover attached by a hard side case hinge. The hard side case base has hard side case vertical divider rack ledges molded into it. The vertical divider racks are removably set in place on the hard side case vertical divider rack ledges and are adjustable from side to side. The vertical dividers are removably placed on the vertical divider racks and the perforated grid panels are removably placed within the vertical dividers.

Yet another object of the present invention provides for the tool and small parts box to be removably placed on either or both ends of the hard side case base between the vertical dividers and the end on the hard side case base. The hard side case would be made in a plurality of sizes each holding a different amount of vertical dividers.

Yet another object of the present invention provides for the hard side case, the perforated grid panels, and the tool and small parts storage box, to be molded from a plastic such as, but not limited to: polypropylene, acrylonitrile butadiene styrene, or the like. The hard side case hinge is preferably comprised of plastic parts molded within the hard side case base and the hard side case cover; however, it may also be comprised of a linear rod placed through plastic hinge parts molded within the hard side case base and the hard side case cover. The hard side case storage compartment cover possesses a locking device such as but not limited to a hard side case cover storage compartment cover latch molded within it or other locking device such as a buckle, snap, hook and loop fastener or the like.

Still yet another object of the present invention provides for the vertical dividers to be standard file folders comprised of cardboard and a metal hanging rods or a custom formed vertical dividers comprised or materials such as, but not limited to: vinyl, polypropylene or the like with metal hanging rods. The perforated grid panels are molded plastic and with an open grid design such that the fishing hook from the fishing lure can be removably affixed to them. The perforated grid panels come in various sizes and colors.

Still yet another object of the present invention provides for the apparatus comprising either one (1) or two (2) tool and small parts storage boxes that fit on either end of the hard side case between the vertical dividers and the hard side case base.

Yet another object of the present invention provides for the apparatus comprising a tool and small parts storage box, a tool and small parts storage box base, a tool and small parts storage box handle, a tool and small parts storage box cover, a tool and small parts storage box latch, a tool and small parts storage box hinge, and a tool and small parts storage box compartment.

Still yet another object of the present invention provides for the apparatus comprising two (2) hard side case cover storage compartments, and two (2) hard side case cover storage compartment covers with integral hard side case cover storage compartment cover latches molded within them.

Still yet another object of the present invention provides for the fishing lure storage device, in an alternate embodiment, comprising a soft side case, soft side case carrying straps, a soft side case zipper, soft side case dividers, and perforated grid panels. The soft side case is comprised of materials such as a polyester fabric or a ballistic nylon material similar to that used on backpacks duffel bags and similar carrying devices and sewn together by heavy-duty industrial sewing machines. The compartments are composed of a flexible molded plastic material such as to vinyl or polypropylene. The soft side case would be made in a plurality of sizes each holding a different amount of soft sided case dividers.

Another object of the present invention provides for the fishing lure storage device, in an alternate embodiment, further comprising perforated grid panels. These perforated grid panels are capable of maintaining fishing lures removably affixed to the perforated grid panels by the fishing lure hooks.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
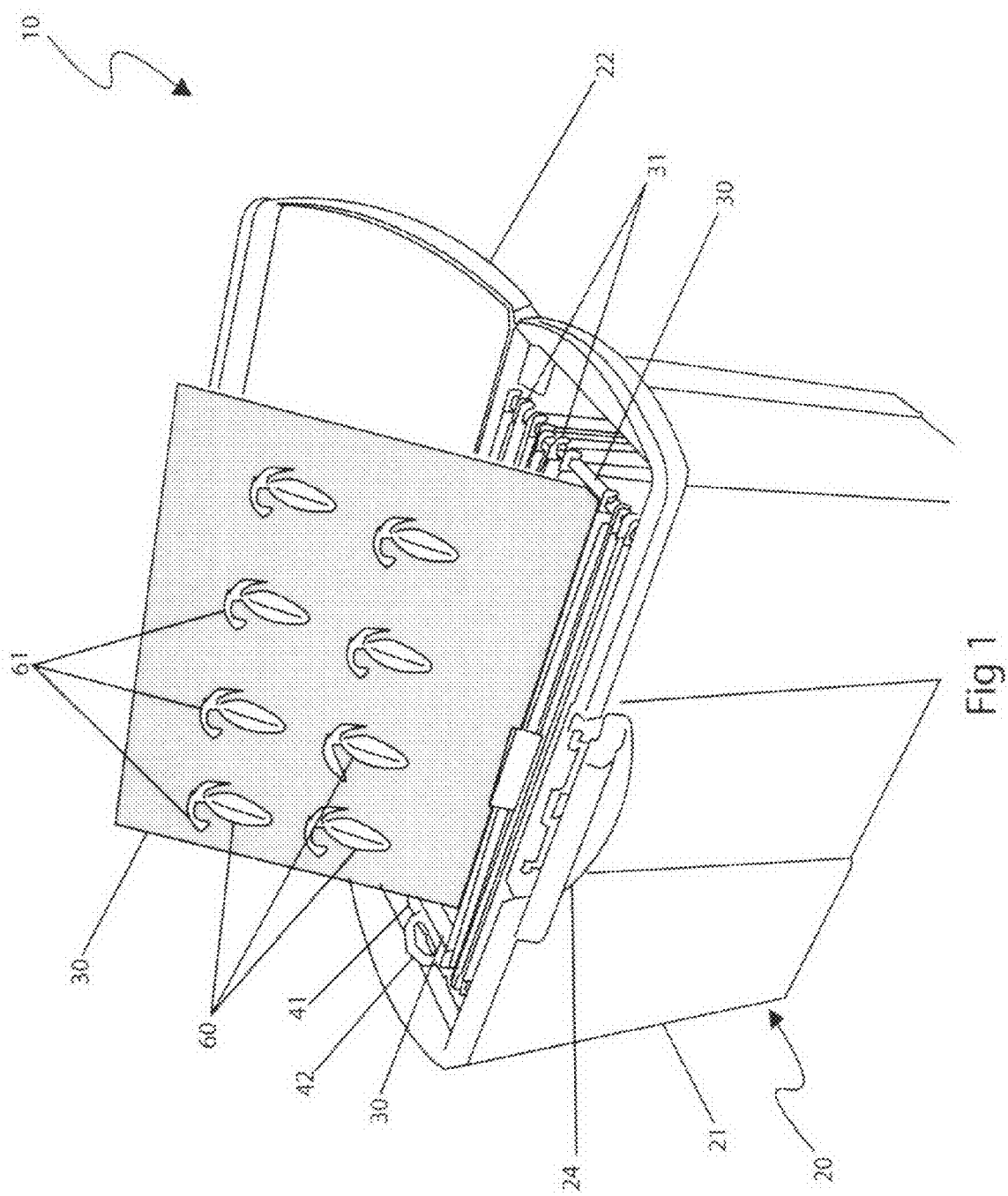
FIG. 1 is a top perspective view of the fishing lure storage device 10, with the cover open and with a storage panel partially pulled out according to a preferred embodiment of the present invention.

10 fishing lure storage device
20 hard side case
21 hard side case base
22 hard side case cover
23 hard side case hinge
24 hard side case latch
25 hard side case handle
26 hard side case vertical divider rack ledge
27 hard side case cover storage compartment
28 hard side case cover storage compartment cover
29 hard side case cover storage compartment cover latch 30 vertical divider rack
31 vertical divider
32 perforated grid panel
40 tool and small parts storage box
41 tool and small parts storage box base
42 tool and small parts storage box handle
43 tool and small parts storage box cover
44 tool and small parts storage box latch
45 tool and small parts storage box hinge
46 tool and small parts storage box compartment
50 soft side case
51 soft side case carrying strap
52 soft side case zipper
53 soft side case dividers
60 fishing lure
61 fishing lure hook

DETAILED DESCRIPTION OF THE PREFERRED EMBODIMENT

Figure 3:
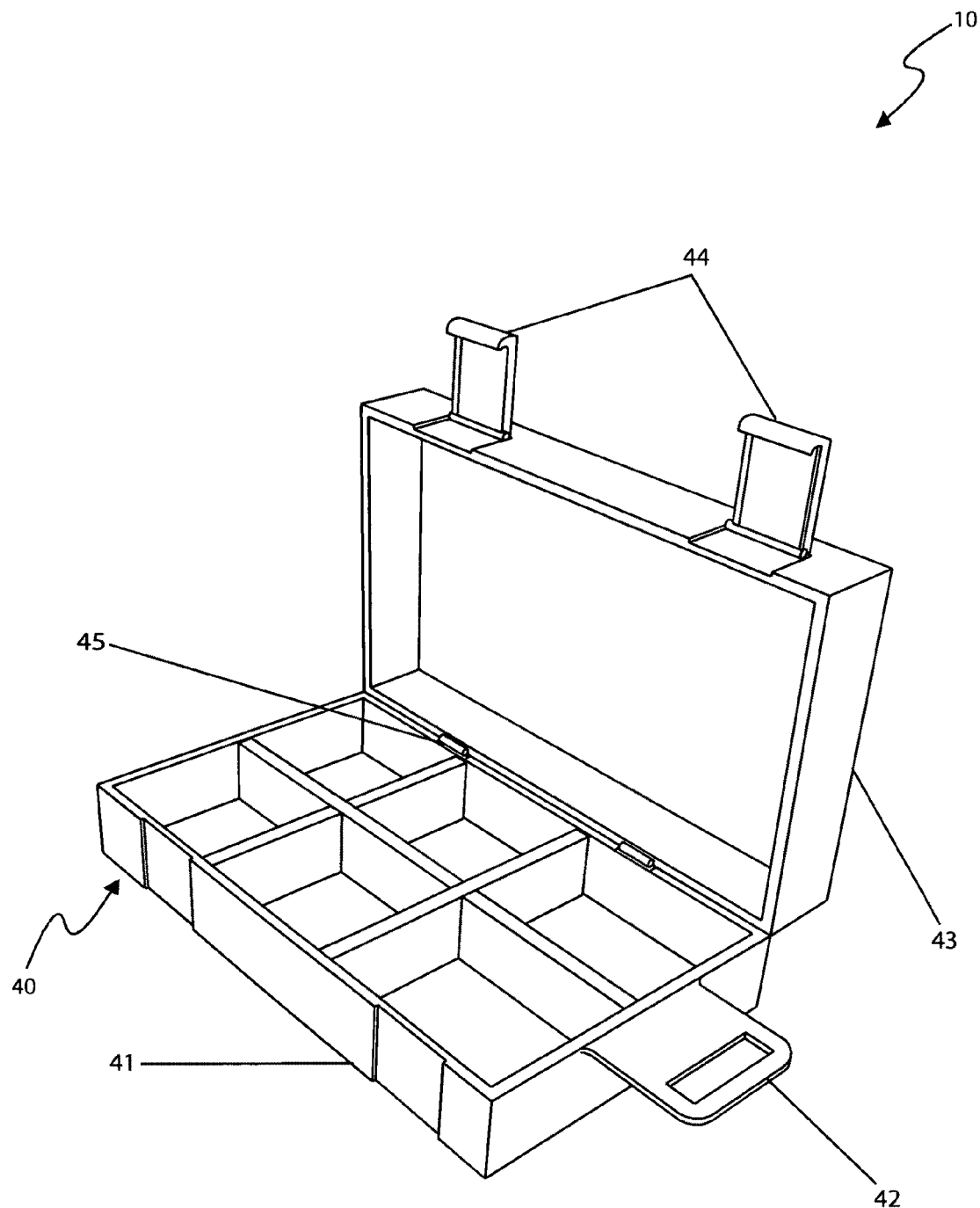
FIG. 3 is a top perspective view of the fishing lure storage device 10, tool and small parts storage box according to a preferred embodiment of the present invention.
Figure 4:
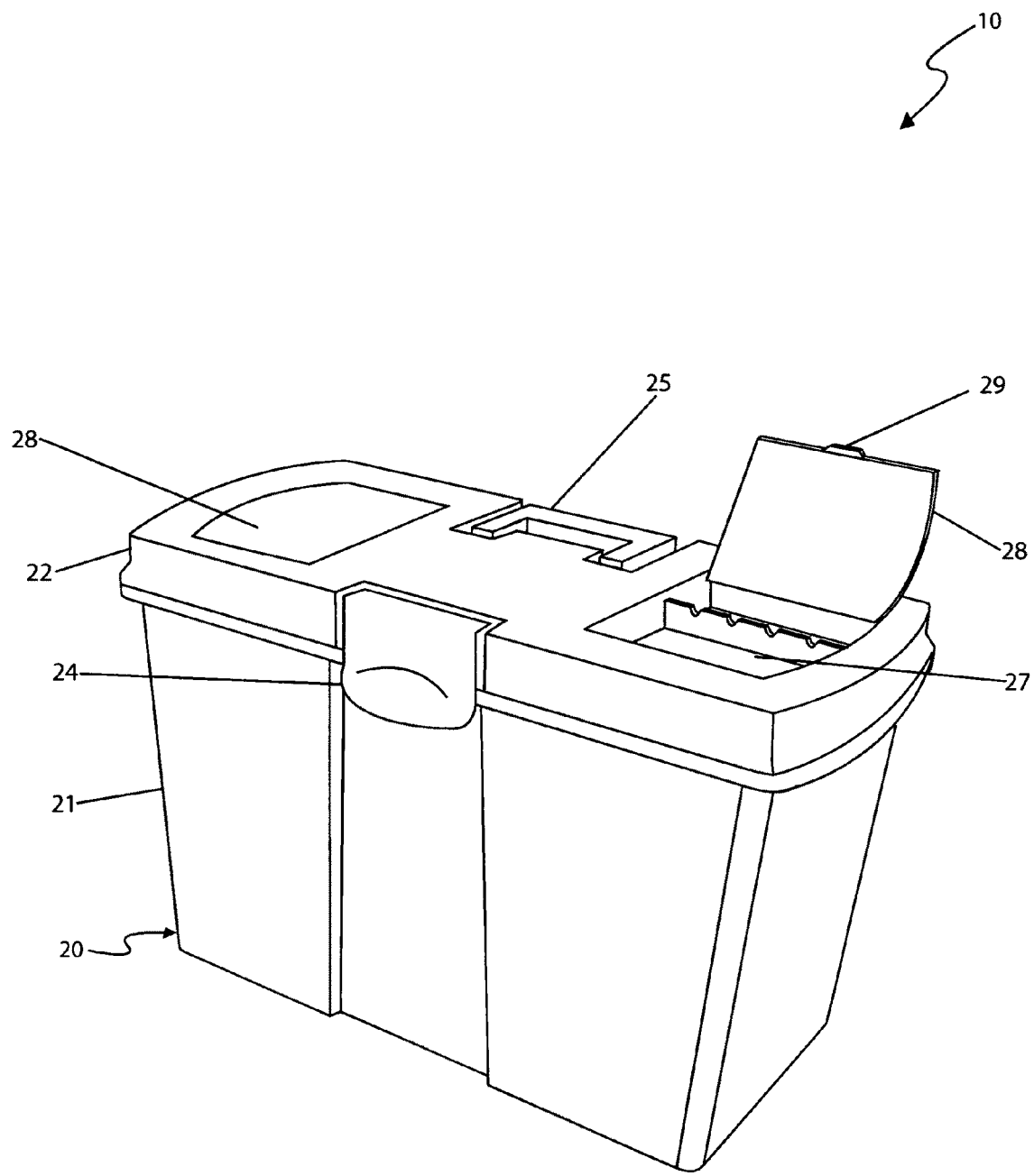
FIG. 4 is a top perspective view of the fishing lure storage device 10, with the cover closed according to a preferred embodiment of the present invention.
Figure 5:
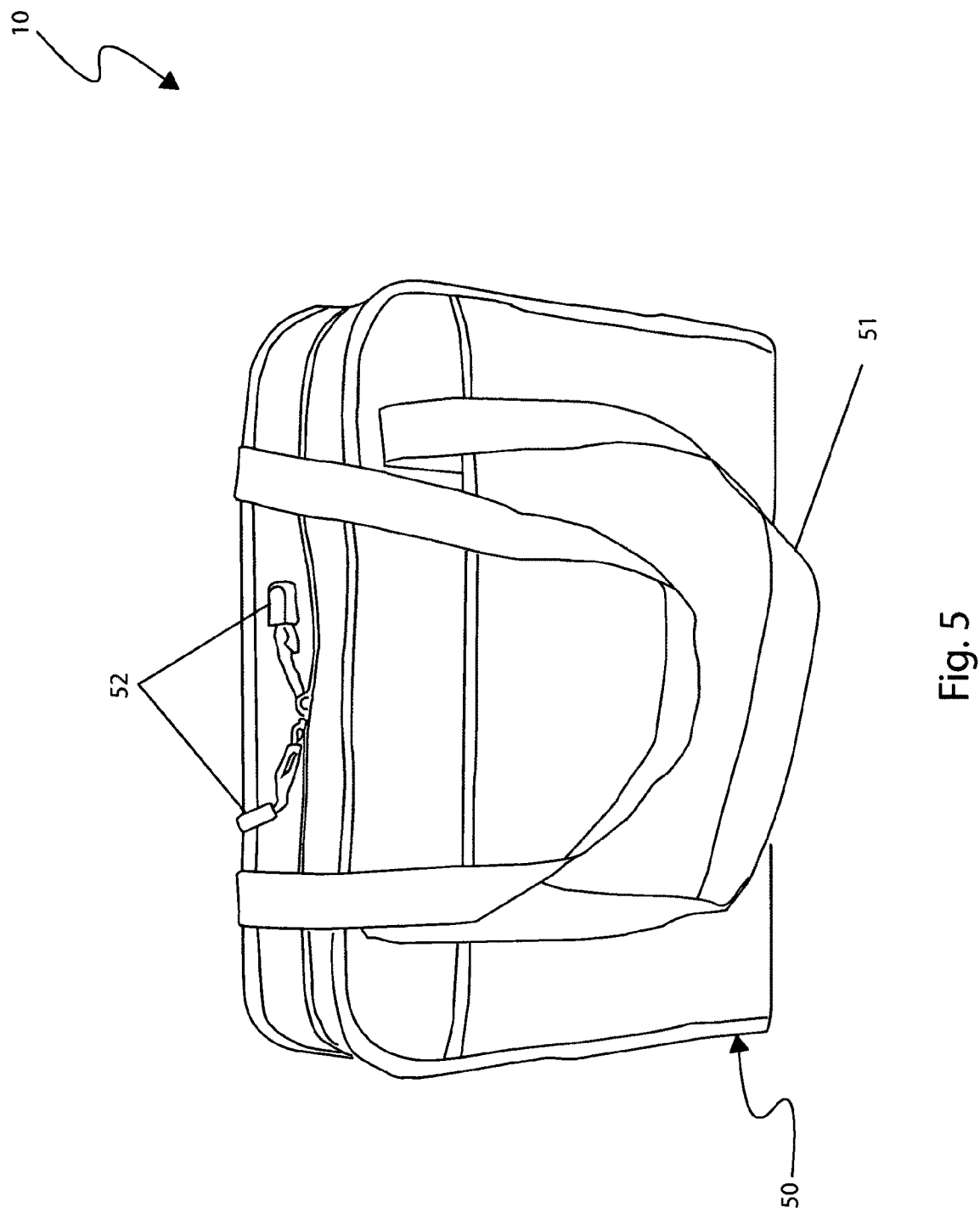
FIG. 5 is a top perspective view of the fishing lure storage device 10, according to an alternate embodiment of the present invention; and, FIG. 6 is a side perspective view of the fishing lure storage device 10, with the case open according to an alternate embodiment of the present invention.
Figure 6:
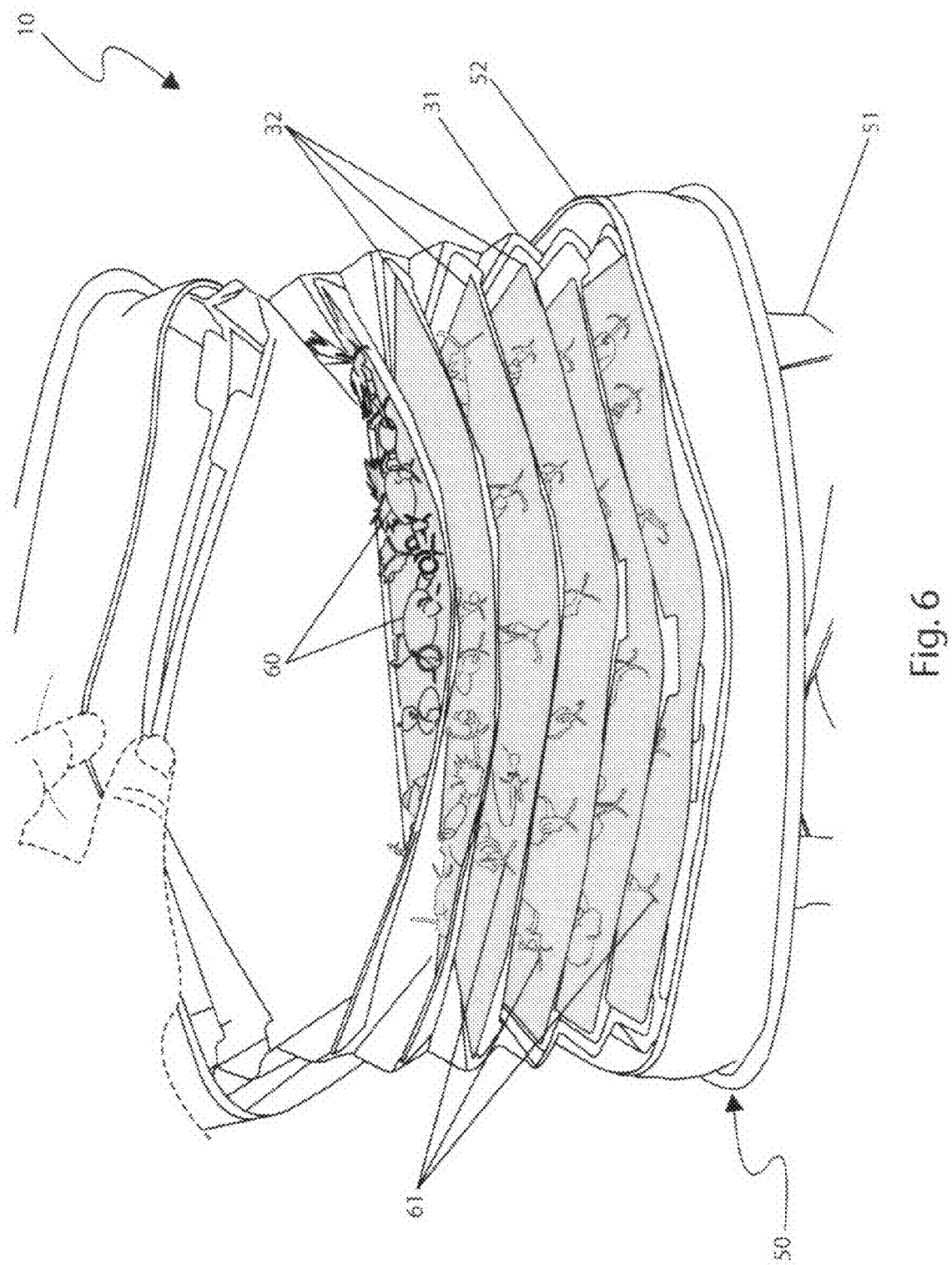

The best mode for carrying out the invention is presented in terms of its preferred embodiment, herein depicted within FIGS. 1 through 4, with an alternate embodiment depicted in FIGS. 5 and 6. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a device and method for a fishing lure storage device (herein described as the "apparatus") 10, which provides a means for organizing, storing, and transporting a plurality of fishing lures 60 comprising a series of vertical dividers 31 as would be found in a filing cabinet each having a perforated grid panel 32 that allows the fishing lure 60 and fishing lure hook 61 to be hung. In such a manner, the user can organize the fishing lures 60 by style, size, or class and remove the respective perforated grid panel 32 from the vertical dividers 31 to select the appropriate fishing lure 60. This storage method allows fishing lures 60 to be stored with the fishing lure hooks 61 attached while reducing the chance of the fishing lure hooks 61 and fishing lures 60 from becoming entangled. The apparatus 10 also comprises a hard side case handle 25 or an alternate soft side case carrying straps 51 for transportation, hard side case cover storage compartments 27, and a tool and small parts storage box 40 for added storage.

Referring now to FIG. 1, a top perspective view of the apparatus 10, according to the preferred embodiment of the present invention, is disclosed. The apparatus 10 comprises a hard side case 20, a hard side case base 21, a hard side case cover 22, a hard side case hinge 23, a hard side case latch 24, a hard side case handle 25, hard side case vertical divider rack ledges 26, a hard side case cover storage compartment 27, a hard side case cover storage compartment cover 28, a hard side case cover storage compartment cover latch 29, a vertical divider rack 30, vertical dividers 31, perforated grid panels 32, a tool and small parts storage box 40, a tool and small parts storage box base 41, a tool and small parts storage box handle 42, a tool and small parts storage box cover 43, a tool and small parts storage box latch 44, and a tool and small parts storage box hinge 45. The hard side case 20 is a molded plastic case with a hard side case cover 22 attached by a hard side case hinge 23. The hard side case base 21 has hard side case vertical divider rack ledges 26 molded into it.

The vertical divider racks 30 are removably set in place on the hard side case vertical divider rack ledges 26 such that they are adjustable from side to side. The vertical dividers 31 are removably placed on the vertical divider racks 30 and the perforated grid panels 32 are removably placed within the vertical dividers 31. The tool and small parts box 40 is removably placed on either or both ends of the hard side case base 21 between the vertical dividers 31 and the end on the hard side case base 21 (see FIG. 2). It is envisioned that the hard side case 20 would be made in a plurality of sizes each holding a different amount of vertical dividers 31.

The hard side case 20, the perforated grid panels 32, and the tool and small parts storage box 40, are envisioned to be molded from a plastic such as, but not limited to: polypropylene, acrylonitrile butadiene styrene, or the like. The hard side case hinge 23 is preferably comprised of plastic parts molded within the hard side case base 21 and the hard side case cover 22; however, it may also be comprised of a linear rod placed through plastic hinge parts molded within the hard side case base 21 and the hard side case cover 22. The hard side case storage compartment cover 28 is envisioned to have a locking device such as but not limited to a hard side case cover storage compartment cover latch 29 molded within it or other locking device such as a buckle, snap, hook and loop fastener or the like. The vertical dividers 31 are envisioned to be either standard file folders comprised of cardboard and a metal hanging rods or a custom formed vertical dividers comprised or materials such as, but not limited to: vinyl, polypropylene or the like with metal hanging rods. The perforated grid panels 32 are envisioned to be molded plastic and with an open grid design such that the fishing hook 61 from the fishing lure 60 can be removably affixed to them. The perforated grid panels 32 are also envisioned to come in various sizes and colors.

Figure 2:
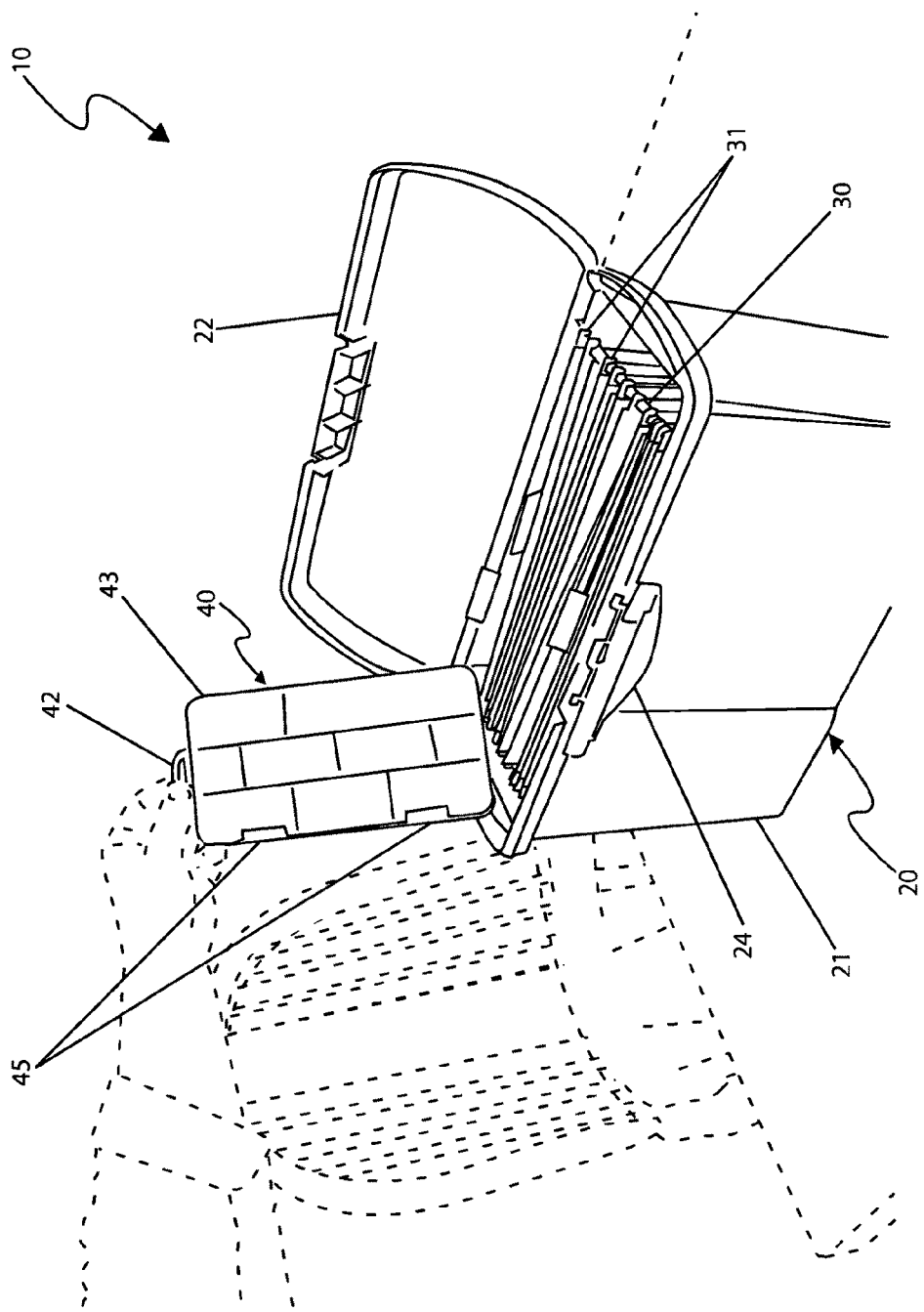
FIG. 2 is a top environmental view of the fishing lure storage device 10, with a tool and small parts storage box shown according to a preferred embodiment of the present invention.

Referring now to FIG. 2, a top environmental view of the apparatus 10, with a tool and small parts storage box 40 shown according to a preferred embodiment of the present invention, is disclosed. The apparatus 10 comprises either one (1) or two (2) tool and small parts storage boxes 40 that fit on either end of the hard side case 20 between the vertical dividers 31 and the hard side case base 21.

Referring now to FIG. 3, a top perspective view of the apparatus 10 tool and small parts storage box 40 according to a preferred embodiment of the present invention, is disclosed. The apparatus 10 comprises a tool and small parts storage box 40, a tool and small parts storage box base 41, a tool and small parts storage box handle 42, a tool and small parts storage box cover 43, a tool and small parts storage box latch 44, a tool and small parts storage box hinge 45, and a tool and small parts storage box compartment 46.

Referring now to FIG. 4, a top perspective view of the apparatus 10 with the hard side case cover 22 closed according to a preferred embodiment of the present invention, is disclosed. The apparatus 10 comprises two (2) hard side case cover storage compartments 27, and two (2) hard side case cover storage compartment covers 28 with integral hard side case cover storage compartment cover latches 29 molded within them.

Referring now to FIG. 5, a top perspective view of the apparatus 10, according to an alternate embodiment of the present invention, is disclosed. The apparatus 10 comprises a soft side case 50, soft side case carrying straps 51, a soft side case zipper 52, soft side case dividers 53, and perforated grid panels 32. The soft side case 50 is envisioned to be comprised of materials such as a polyester fabric or a ballistic nylon material similar to that used on backpacks duffel bags and similar carrying devices and sewn together by heavy-duty industrial sewing machines. The compartments are envisioned to be a flexible molded plastic material such as to vinyl or polypropylene. It is envisioned that the soft side case 50 would be made in a plurality of sizes each holding a different amount of soft sided case dividers 53.

Referring now to FIG. 6, a side perspective environmental view of the apparatus 10 is shown with the case open according to an alternate embodiment of the present invention. The apparatus 10 comprises the items listed in FIG. 4 and the perforated grid panels 32. The perforated grid panels 32 are shown within their soft side vertical dividers 31 with fishing lures 60 removably affixed to the perforated grid panels 32 by the fishing lure hooks 61.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be utilized by performing the following steps: releasing the hard side case latch 24; opening the hard side case cover 22; removing one of the perforated grid panels 32 from one of the vertical dividers 31; removably attaching the fishing lure 60 to the perforated grid panel 32 by placing the fishing lure hook 61 thru an opening on the perforated gird panel 32; repeating the process with as many fishing lures 60 and perforated grid panels 32 as necessary; removing the tool and small parts storage box 40 by pulling the tool and small parts storage box handle 42; releasing the tool and small parts storage box latch 44; opening the tool and small parts storage box cover 43; placing tools and small items or the like, within the tool and small parts storage box 40; closing the tool and small parts storage box cover 43; securing the tool and small parts storage box latch 44; placing the tool and small parts storage box 40 back into the hard side case base 21; closing the hard side case cover 22; securing the hard side case latch 24; releasing the hard side case cover storage compartment cover latch 29; opening the hard side case cover storage compartment cover 28; placing tools and small parts within the hard side case cover storage compartment 27; closing the hard side case cover storage compartment cover 28; and securing the hard side case cover storage compartment cover latch 29.

The alternate embodiment of the present invention can be utilized by the common user in a simple and effortless manner with little or no training. After initial purchase or acquisition of the apparatus 10, it would be utilized by performing the following steps: un-zipping the soft side case zipper 52; removing one of the perforated grid panels 32 from one of the soft side case dividers 53; removably attaching the fishing lure 60 to the perforated grid panel 32 by placing the fishing lure hook 61 thru an opening on the perforated gird panel 32; repeating the process with as many fishing lures 60 and perforated grid panels 32 as necessary; zipping the soft side case zipper 52.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A fishing lure and hook organizing apparatus for separating and transporting fishing lures and associated hooks between remote locations, said fishing lure and hook organizing apparatus comprising:
   a portable case;
   a plurality of rectilinear divider racks seated within said case and disposed adjacent to a top edge thereof;
   a plurality of vertical dividers removably engaged with said divider racks and being disposed intermediately therebetween such that each of said vertical dividers is juxtaposed side-by-side within said case; and,
   a plurality of panels removably seated within selected ones of said vertical dividers respectively, said panels receiving and supporting the fishing lures and hooks at spaced positions for preventing entanglement therebetween.

2. The fishing lure and hook organizing apparatus of claim 1, wherein said case comprises:
   a base defining a cavity for receiving said vertical dividers and said panels therein;
   a cover pivotally coupled to said base, said cover having a latch attached thereto and removably coupled to said top edge of said case; and,
   a handle pivotally attached to said cover and oppositely seated from said latch.

3. The fishing lure and hook organizing apparatus of claim 2, wherein said case cover comprises:
   first and second storage compartments formed in a top surface of said case cover, each of said first and second storage compartments being provided with respective locking latches attached thereto, said first and second storage compartments being independently adapted between open and closed positions for storing items therein.

4. The fishing lure and hook organizing apparatus of claim 2, wherein said case further comprises:
   a portable tool box;
   a handle attached to an edge of said tool box; and,
   a cover pivotally adaptable between open and closed positions;
   wherein said tool box is removably placed between said vertical dividers and one end of said base.

5. The fishing lure and hook organizing apparatus of claim 1, wherein said case comprises: one of a hard cover case and a soft cover case respectively.

6. The fishing lure and hook organizing apparatus of claim 5, wherein said soft cover case comprises:
   a carrying strap attached thereto; and,
   a fastening member extending along a perimeter of said soft cover case.

7. A fishing lure and hook organizing apparatus for separating and transporting fishing lures and associated hooks between remote locations, said fishing lure and hook organizing apparatus comprising:
   a portable case;

a plurality of rectilinear divider racks seated within said case and disposed adjacent to a top edge thereof, said divider racks being oriented parallel to each other and further being coplanar;

a plurality of vertical dividers removably engaged with said divider racks and being disposed intermediately therebetween such that each of said vertical dividers is juxtaposed side-by-side within said case; and, a plurality of panels removably seated within selected ones of said vertical dividers respectively, said panels receiving and supporting the fishing lures and hooks at spaced positions for preventing entanglement therebetween.

8. The fishing lure and hook organizing apparatus of claim 7, wherein said case comprises:

a base defining a cavity for receiving said vertical dividers and said panels therein;

a cover pivotally coupled to said base, said cover having a latch attached thereto and removably coupled to said top edge of said case; and, a handle pivotally attached to said cover and oppositely seated from said latch.

9. The fishing lure and hook organizing apparatus of claim 8, wherein said case cover comprises:

first and second storage compartments formed in a top surface of said case cover, each of said first and second storage compartments being provided with respective locking latches attached thereto, said first and second storage compartments being independently adapted between open and closed positions for storing items therein.

10. The fishing lure and hook organizing apparatus of claim 8, wherein said case further comprises:

a portable tool box;

a handle attached to an edge of said tool box; and, a cover pivotally adaptable between open and closed positions;

wherein said tool box is removably placed between said vertical dividers and one end of said base.

11. The fishing lure and hook organizing apparatus of claim 7, wherein said case comprises: one of a hard cover case and a soft cover case respectively.

12. The fishing lure and hook organizing apparatus of claim 11, wherein said soft cover case comprises:

a carrying strap attached thereto; and, a fastening member extending along a perimeter of said soft cover case.

13. A method for separating and transporting fishing lures and associated hooks between remote locations, said method comprising the chronological steps of:

providing a case;

providing and attaching a plurality of rectilinear tracks to said case;

providing and hanging a plurality of vertical dividers to said rectilinear tracks respectively;

providing and positioning a plurality of panels within said vertical dividers;

adapting the case to an open position;

removing one of the panels from one of the vertical dividers; and, removably attaching the fishing lures to the one panel by placing the fishing lure hooks thru an opening of the one panel.

14. The method of claim 13, further comprising the steps of:

providing a tool box;

adapting the tool box to an open position;

placing items within the tool box;

adapting the tool box to a closed position; and, placing the tool box into the case.

15. The method of claim 14, further comprising the steps of:

providing first and second storage compartments at a cover of the base;

selectively adapting the first and second storage compartments to an open position respectively;

placing items within the first and second storage compartments; and, selectively adapting the first and second storage compartments to a closed position respectively.

\* \* \* \* \*